United States Patent
Yao et al.

(10) Patent No.: US 11,260,815 B2
(45) Date of Patent: Mar. 1, 2022

(54) PROTECTION OF A VEHICLE OCCUPANT

(71) Applicant: Volvo Car Corporation, Gothenburg (SE)

(72) Inventors: Jianfeng Yao, Mölndal (SE); Katarina Bohman, Lerum (SE); Bo Svanberg, Landvetter (SE); Merete Östman, Torslanda (SE)

(73) Assignee: Volvo Car Corporation, Gothenburg (SE)

( * ) Notice: Subject to any disclaimer, the term of this patent is extended or adjusted under 35 U.S.C. 154(b) by 39 days.

(21) Appl. No.: 16/597,688

(22) Filed: Oct. 9, 2019

(65) Prior Publication Data
US 2020/0114852 A1    Apr. 16, 2020

(30) Foreign Application Priority Data
Oct. 10, 2018  (EP) ..................................... 18199606

(51) Int. Cl.
*B60R 21/013* (2006.01)
*B60R 21/206* (2011.01)
(Continued)

(52) U.S. Cl.
CPC .......... *B60R 21/013* (2013.01); *B60R 21/206* (2013.01); *B60R 21/231* (2013.01);
(Continued)

(58) Field of Classification Search
CPC ... B60R 21/013; B60R 21/206; B60R 21/231; B60R 21/264; B60R 2021/0051;
(Continued)

(56) References Cited

U.S. PATENT DOCUMENTS 5,536,043 A    7/1996  Lang et al.
6,817,627 B2   11/2004 Galmiche et al.
(Continued)

FOREIGN PATENT DOCUMENTS

CN    2237576 Y    10/1996
CN    101061025 A  10/2007
(Continued)

OTHER PUBLICATIONS

European Search Report issued in application No. 18199606.7 completed Dec. 19, 2018, 2 pp.
(Continued)

*Primary Examiner* — Jonathan Ng
*Assistant Examiner* — Daniel M. Keck
(74) *Attorney, Agent, or Firm* — Shumaker & Sieffert, P.A.

(57) ABSTRACT

The present disclosure relates to a method performed by an occupant protection system of a vehicle for supporting protection of a vehicle occupant in the event of an ongoing or imminent collision. The occupant protection system comprises an airbag panel arrangement arranged in connection with a dashboard of the vehicle, which airbag panel arrangement comprises an inflatable airbag adapted to upon deployment protect lower body parts of a vehicle occupant seated in a vehicle seat facing the dashboard. The occupant protection system determines a distance in a predeterminable direction between the airbag panel arrangement or the dashboard and the vehicle seat or an occupant seated in the vehicle seat; determines that the distance exceeds a predeterminable maximum threshold value; determines that one or more conditions for deployment of the airbag is fulfilled; and displaces the airbag panel arrangement outwardly from the dashboard by means of a panel displacing system.

17 Claims, 7 Drawing Sheets

(51) Int. Cl.
  *B60R 21/231* (2011.01)
  *B60R 21/264* (2006.01)
  *B60R 21/00* (2006.01)
  *B60R 21/01* (2006.01)
  *B60R 21/26* (2011.01)
(52) U.S. Cl.
  CPC .... *B60R 21/264* (2013.01); *B60R 2021/0051* (2013.01); *B60R 2021/0053* (2013.01); *B60R 2021/01286* (2013.01); *B60R 2021/23169* (2013.01); *B60R 2021/26058* (2013.01)
(58) Field of Classification Search
  CPC .. B60R 2021/0053; B60R 2021/01286; B60R 2021/23169; B60R 2021/26058; B60R 21/01
  See application file for complete search history.

(56) References Cited

U.S. PATENT DOCUMENTS

| | | | | |
|---|---|---|---|---|
| 6,846,015 | B2* | 1/2005 | Meduvsky | B60R 21/02 188/188 |
| 7,048,298 | B2* | 5/2006 | Arwood | B60R 21/206 280/730.1 |
| 7,762,577 | B2 | 7/2010 | Kato et al. | |
| 8,590,928 | B2 | 11/2013 | Spahn et al. | |
| 10,363,896 | B2* | 7/2019 | Odai | B60R 21/20 |
| 2003/0001372 | A1* | 1/2003 | Browne | B60R 21/045 280/751 |
| 2003/0188908 | A1* | 10/2003 | Abe | B60R 21/01558 180/282 |
| 2004/0046377 | A1* | 3/2004 | Meduvsky | B60R 21/0155 280/752 |
| 2004/0169363 | A1* | 9/2004 | Fukawatase | B60R 21/0132 280/752 |
| 2005/0006884 | A1* | 1/2005 | Cooper | B60R 21/206 280/735 |
| 2017/0334383 | A1* | 11/2017 | Paxton | B60R 21/0136 |
| 2020/0094766 | A1* | 3/2020 | Malapati | B60R 21/205 |
| 2020/0164827 | A1* | 5/2020 | Oh | B60R 21/04 |

FOREIGN PATENT DOCUMENTS

| | | | | |
|---|---|---|---|---|
| CN | 102887128 | A | 1/2013 | |
| DE | 19738203 | A1 | 3/1999 | |
| DE | 19925377 | A1 | 12/2000 | |
| EP | 0421572 | A2 | 4/1991 | |
| GB | 2408239 | A * | 5/2005 | ........... B60R 21/013 |
| JP | 2003104163 | A | 4/2003 | |
| JP | 2003306121 | A | 10/2003 | |
| JP | 2004168100 | A | 6/2004 | |
| JP | 2005096511 | A | 4/2005 | |
| JP | 2009083556 | A | 4/2009 | |
| WO | 9915371 | A1 | 4/1999 | |
| WO | 1999015371 | A1 | 4/1999 | |
| WO | 2016164138 | A1 | 10/2016 | |
| WO | 2018153908 | A1 | 8/2018 | |

OTHER PUBLICATIONS

Examination Report from counterpart European Application No. 18199606.7, dated Jan. 18, 2021, 5 pp.
Response to Examination Report filed in European Application No. 18199606.7 dated Feb. 22, 2021, 20 pp.
Notice of Intent to Grant issued in European Application No. 18199606.7 on Apr. 8, 2021, 8 pp.

* cited by examiner

PROTECTION OF A VEHICLE OCCUPANT

This application claims priority to European application no. 18199606.7 filed Oct. 10, 2018, the entire content of which is incorporated herein by reference.

TECHNICAL FIELD

The present disclosure relates to supporting protection of a vehicle occupant in the event of an ongoing or imminent collision.

BACKGROUND

Many vehicles developed today are semi-autonomous, implying that a vehicle driver of such a vehicle to some extent may be assisted by the vehicle and/or different systems thereof in vehicle maneuvering. The driver may then for shorter or longer periods fully or at least partly hand over the control of the vehicle and take a less active role in e.g. driving said vehicle. During such occasions, the driver may be provided the opportunity to sit in a relaxed posture in the driver's seat, for instance moving back said seat from a normal sitting position, and/or to recline said seat and/or the backrest thereof to a leaned back position. In such a situation however—should an ongoing or imminent collision situation occur—a knee airbag commonly provided beneath the vehicle steering wheel, may due to a potentially increased distance and/or gap between the driver's knees and said knee airbag, not be able to provide sufficient protection.

WO2018153908 A1, for instance, relates to a vehicle occupant protection system, and discloses how said system differentiates between a situation in which the vehicle occupant is in a region at a standard distance relative to a first airbag and a situation in which the vehicle occupant is in a rear region that is further away from the first airbag, and how in the latter case, in the event of a collision, a second airbag is activated in addition to the first airbag. However, although the system disclosed in WO2018153908 A1 during protection of the vehicle occupant takes into account said vehicle occupant's position in relation to an airbag, there is still room for improved and/or alternative solutions to—in addition to providing sufficient protection for lower body parts of a vehicle occupant seated in a vehicle seat located at a position normal for driving said vehicle—provide sufficient protection for said vehicle occupant when seated in a moved back and/or greatly reclined seating position.

SUMMARY OF THE INVENTION

It is therefore an object of embodiments herein to provide an approach of in an alternative and/or improved manner support protection of lower body parts of a vehicle occupant in the event of an ongoing or imminent collision.

According to a first aspect of embodiments herein, the object is achieved by an airbag panel arrangement for supporting protection of a vehicle occupant in the event of an ongoing or imminent collision, which airbag panel arrangement is adapted to be arranged in connection with a dashboard of a vehicle, and which airbag panel arrangement comprises an inflatable airbag adapted to upon deployment protect lower body parts of a vehicle occupant seated in a vehicle seat facing the dashboard. The airbag panel arrangement comprises a panel displacing system adapted for supporting displacement of the airbag panel arrangement outwardly from the dashboard.

Thereby, there is introduced an approach which, should a situation with an ongoing or imminent collision occur, enables—with support from and/or by means of the airbag panel arrangement and the airbag comprised therein—protection of lower legs and/or knees of a vehicle driver or passenger seated in said dashboard-facing vehicle seat. In other words, the airbag panel arrangement is adapted to be positioned in relation to a vehicle dashboard and/or in relation to a dashboard-facing vehicle seat in a manner providing for that the airbag upon deployment aims to protect lower body parts of a vehicle occupant seated in said seat. That is, since the airbag panel arrangement comprises a panel displacing system adapted for supporting displacement of the airbag panel arrangement outwardly from the dashboard, the airbag panel arrangement may support being displaced outwards and/or away from the dashboard. Thus, in addition to being adapted to be arranged in a default and/or original location in connection with a vehicle dashboard, the airbag panel arrangement is adapted to additionally—by means of the panel displacing system—be able to be arranged at a position oriented and/or located outwardly from the dashboard, such as towards a vehicle seat facing said dashboard. Thereby, the airbag panel arrangement supports being arranged at a default position in relation to the dashboard, and in addition thereto, also at an at least first ejected position further out and/or away from the dashboard. The airbag panel arrangement may accordingly support that a gap and/or distance between the vehicle seat or lower body parts of a potential vehicle occupant seated therein and the airbag panel arrangement may be decreased should the airbag panel arrangement be displaced to the at least first ejected position. Consequently, the airbag panel arrangement may support that in the event of an ongoing or impending collision, said airbag panel arrangement may be displaced outwardly from the dashboard, subsequently closer to—and/or at a modified inclination toward—the vehicle seat and/or a potential vehicle occupant seated therein, a scenario which may be desirable should the vehicle occupant sit in a relaxed posture/position, i.e. should the vehicle seat be situated at a moved back position and/or should said seat and/or a backrest thereof be greatly reclined. In such a scenario, with the airbag panel arrangement supporting that the airbag in the at least first ejected position may be deployed closer to—and/or from an improved angle—in view of the vehicle seat and/or potential vehicle occupant seated in said vehicle seat, the protection provided by the deployed airbag to the potential vehicle occupant in his/her moved back and/or greatly reclined position, may be more sufficient than should the airbag be deployed with the airbag panel arrangement located in its default position e.g. situated further away from the vehicle occupant. Accordingly, submarining—i.e. the tendency of the vehicle occupant in a collision situation sliding forward under his/her seat belt—may be avoided in situations where the vehicle occupant may be seated in a moved back and/or greatly reclined position. Thus, with the introduced airbag panel arrangement supporting airbag deployment both when the airbag panel arrangement is in the default position—which may be suitable when the vehicle seat is in a normal position for driving—and when the airbag panel arrangement is in the at least first ejected position—which may be suitable when the vehicle seat is moved back and/or when the seat and/or a backrest thereof is greatly reclined—different protection may be supported for different vehicle occupant seating scenarios.

For that reason, an approach is provided which in an alternative and/or improved manner supports protection of a lower body parts of a vehicle occupant in the event of an ongoing or imminent collision The technical features and corresponding advantages of the above mentioned method will be discussed in further detail in the following.

By introducing an airbag panel arrangement for supporting protection of a vehicle occupant in the event of an ongoing or imminent collision, which airbag panel arrangement is adapted to be arranged in connection with a dashboard of a vehicle, and which airbag panel arrangement comprises an inflatable airbag adapted to upon deployment protect lower body parts of a vehicle occupant seated in a vehicle seat facing the dashboard, an approach is provided which, should a situation with an ongoing or imminent collision occur, enables—with support from and/or by means of the airbag panel arrangement and the airbag comprised therein—protection of lower legs and/or knees of a vehicle driver or passenger seated in said dashboard-facing vehicle seat. That is, the airbag panel arrangement is adapted to be positioned in relation to a vehicle dashboard and/or in relation to a dashboard-facing vehicle seat in a manner providing for that the airbag upon deployment aims to protect lower body parts of a vehicle occupant seated in said seat. The airbag panel arrangement may thus be adapted to be provided in any arbitrary inclination in view of the dashboard and/or the vehicle seat, and may further for instance be comprised in, be integrated into, be flush with and/or constitute an extension in an essentially downward direction of, the dashboard.

The airbag panel arrangement may comprise and/or be constituted by any arbitrary known material, such as e.g. plastic, be rigid, and may further be of any arbitrary dimensions deemed appropriate for the situation at hand, e.g. defined in view of functional and/or aesthetic criteria. The airbag panel arrangement may thus have a thickness—which may vary along the panel—for instance ranging from a few millimetres up to tenths of millimetres. In a similar manner, the airbag panel arrangement may have a width and/or height—which may vary along the panel—for instance ranging from tenths of millimetres up to hundreds of millimetres. The airbag panel arrangement may further have dimensions suitable for said airbag panel arrangement to fit essentially beneath a vehicle steering wheel and/or in connection thereto, and or be fitted with an instrument panel beneath said steering wheel. The airbag panel arrangement may—with exception from novel characteristics thereof which will be described further on—resemble airbag panel arrangements commonly known in the art adapted to be arranged in connection with the vehicle dashboard in front of a vehicle seat, such as a driver's seat, for protection of lower body parts of a vehicle occupant seater therein by means of one or more airbags comprised in—or provided behind—said airbag panel arrangement. The inflatable airbag comprised in the airbag panel arrangement, on the other hand, may be represented by any arbitrary inflatable airbag known in the art. Accordingly, the airbag may be part of an airbag module which further may comprise an inflator and/or gas generator, and the airbag module may in turn be connectable to and/or be part of an airbag system further comprising e.g. crash sensors.

The referred to "vehicle" may be represented by any arbitrary vehicle, for instance an engine-propelled vehicle, such as e.g. a car, truck, lorry, van, bus and/or tractor. The vehicle may furthermore be at least partly semi-autonomous. The expression "airbag panel arrangement" may refer to "airbag arrangement", "panel arrangement", "supporting panel arrangement", "flexible airbag panel arrangement", "displaceable airbag panel arrangement", and/or "airbag cover arrangement, whereas "for supporting protection" may refer to "adapted for supporting protection", "for providing protection" and/or "for supporting safety". Supporting protection of "a vehicle occupant", on the other hand, may refer to supporting protection of "a driver and/or passenger", "a front-row vehicle occupant", "lower body parts of a vehicle occupant", "knees and/or lower legs of a vehicle occupant", "a vehicle occupant seated by a vehicle dashboard", "a vehicle occupant seated in a vehicle seat facing a dashboard of said vehicle both when said seat is in a normal position for driving and when said seat is in a moved back position and/or said seat and/or a backrest thereof is greatly reclined". "In the event of an ongoing or imminent collision" may refer to "should a situation with an ongoing or imminent collision occur" and/or "in the event of an ongoing or impending collision, whereas "collision" may refer to "crash". The expression of the airbag panel arrangement "being adapted" to be arranged may refer to the airbag panel arrangement "being configured" and/or "having characteristics" to be arranged, whereas adapted to be "arranged in connection with" a dashboard may refer to adapted to be "arranged in connection with a lower portion of", "arranged at least partly beneath", "comprised in" and/or "arranged in connection with a steering wheel side of" a dashboard. "Dashboard" on the other hand may refer to "instrument panel", "front panel" and/or "front panel beneath a windshield". The expression "comprising an inflatable airbag" may refer to "comprising an airbag module comprising an inflatable airbag" and/or "comprising an inflatable restraining arrangement, cushion and/or bolster", whereas inflatable airbag "adapted to upon deployment protect" may refer to inflatable airbag "adapted to when deployed protect", "configured to upon deployment protect" and/or "supporting upon deployment protection". The expression "lower body parts" of a vehicle occupant may refer to "lower legs and/or knees" of a vehicle occupant, whereas "seated" may refer to "potentially seated". "Vehicle seat" on the other hand may refer to "front-row vehicle seat" and/or "driver's seat", whereas vehicle seat "facing" the dashboard may refer to vehicle seat "in front of" the dashboard.

Since the airbag panel arrangement comprises a panel displacing system adapted for supporting displacement of the airbag panel arrangement outwardly from the dashboard, the airbag panel arrangement may support being displaced outwards and/or away from the dashboard. That is, in addition to being adapted to be arranged in a default and/or original location in connection with a vehicle dashboard, the airbag panel arrangement is adapted to additionally—by means of the panel displacing system—be able to be arranged at a position oriented and/or located outwardly from the dashboard, such as essentially towards a vehicle seat facing said dashboard. Thereby, the airbag panel arrangement supports being arranged at a default position in relation to the dashboard, and in addition thereto, also at an at least first ejected position further out and/or away from the dashboard. The airbag panel arrangement may accordingly support that a gap and/or distance between the vehicle seat or lower body parts of a potential vehicle occupant seated therein and the airbag panel arrangement may be decreased should the airbag panel arrangement be displaced to the at least first ejected position. Consequently, the airbag panel arrangement may support that in the event of an ongoing or impending collision, said airbag panel arrangement may be displaced outwardly from the dashboard, subsequently closer to—and/or at a modified inclination toward—the vehicle seat and/or a potential vehicle occupant seated therein, a scenario which may be desirable should the vehicle occupant sit in a relaxed posture/position, i.e. should the vehicle seat be situated at a moved back position and/or should said seat and/or a backrest thereof be greatly reclined. In such a scenario, with the airbag panel arrangement supporting that the airbag in the at least first ejected position may be deployed closer to—and/or from an improved angle—in view of the vehicle seat and/or potential vehicle occupant seated in said vehicle seat, the protection provided by the deployed airbag to the potential vehicle occupant in his/her moved back and/or greatly reclined position, may be more sufficient than should the airbag be deployed with the airbag panel arrangement located in its default position which may be situated further away from the vehicle occupant. Accordingly, submarining—i.e. the tendency of the vehicle occupant in a collision situation sliding forward under his/her seat belt—may be avoided in situations where the vehicle occupant may be seated in a moved back and/or greatly reclined position. Thus, with the introduced airbag panel arrangement supporting airbag deployment both when the airbag panel arrangement is in the default position—which may be suitable when the vehicle seat is in a normal position for driving e.g.—and when the airbag panel arrangement is in the at least first ejected position—which may be suitable when the vehicle seat is moved back and/or when the seat and/or a backrest thereof is greatly reclined—different protection may be supported for different vehicle occupant seating scenarios.

The panel displacing system may be adapted to support any arbitrary magnitude of outward displacement of the airbag panel arrangement, for instance ranging from a few millimetres up to hundreds of millimetres. The magnitude of outward displacement of one end of the airbag panel arrangement may further differ from the magnitude of outward displacement of another end thereof. The panel displacing system may moreover be adapted to potentially support one or more different outward displacement, i.e. one or more different ejected positions, the differing magnitudes and/or inclinations thereof for instance being based on a magnitude of a distance to a vehicle seat and/or occupant seated therein, as will be discussed in further detail further on. According to an example, the airbag panel arrangement may comprise arbitrary retaining means enabling said airbag arrangement to—after having been outwardly displaced—staying attached to the dashboard from the at least first ejected position.

"Panel displacing system" may refer to "panel displacing means", "panel ejecting system" and/or merely "displacing system", whereas "adapted for supporting" displacement may refer to "configured for supporting" displacement. "Displacement" of the airbag panel arrangement, on the other hand, may refer to "ejection", "repositioning" and/or "outward displacement" of the airbag panel arrangement, whereas "outwardly" from the dashboard may refer to "away from" the dashboard. "Outwardly from said dashboard" may on the other hand refer to "outwardly from said dashboard essentially toward said vehicle seat and/or a portion thereof". According to an example, the expression "supporting displacement of said airbag panel arrangement outwardly from said dashboard" may refer to "supporting ejection of said airbag panel arrangement from said dashboard".

The panel displacing system may be represented by any arbitrary means supporting rapid displacement of the airbag panel arrangement; said means need for instance to support such rapid displacement of the airbag panel arrangement that—following upon detection of an ongoing or imminent collision—the airbag panel arrangement potentially may be ejected prior to and/or simultaneously with the airbag comprised therein being deployed. The panel displacing system may thus comprise commonly known means according to the foregoing, for instance comprise one or more pre-tensioned spring arrangements and/or pneumatic cylinders known in the art.

Additionally or alternatively, optionally, the panel displacing system may comprise one or more pyro, mechanical and/or electrical actuators. Thereby, displacement of the airbag panel arrangement outwardly from the vehicle dashboard may be accomplished rapidly enough for the airbag panel arrangement to—following upon detection of an ongoing or imminent collision—potentially be ejected prior to and/or simultaneously with the airbag comprised therein being deployed. The pyro, mechanical and/or electrical actuators may be represented by any arbitrary pyro, mechanical and/or electrical actuators known in the art, for instance commonly known pyro actuators of the kind utilized for implementation of e.g. vehicle hood lift-up for improved pedestrian safety.

According to a second aspect of embodiments herein, the object is achieved by an occupant protection system of a vehicle for supporting protection of a vehicle occupant in the event of an ongoing or imminent collision, which occupant protection system comprises an airbag panel arrangement as discussed herein arranged in connection with a dashboard of the vehicle. The occupant protection system comprises a distance determining unit for determining a distance in a predeterminable direction between the airbag panel arrangement or the dashboard and a portion of the vehicle seat or a portion of a body part of an occupant seated in the vehicle seat. The occupant protection system further comprises an exceedance determining unit for determining that the distance exceeds a predeterminable maximum threshold value. Moreover, the occupant protection system comprises a deployment determining unit for determining that one or more conditions for deployment of the airbag module is fulfilled. Furthermore, the occupant protection system comprises a panel displacing unit for displacing the airbag panel arrangement outwardly from the dashboard by means of the panel displacing system.

Similar advantages as those mentioned in the foregoing in relation to the first aspect correspondingly apply to the second aspect, which is why these advantages are not further discussed. Additional advantages, however, will be discussed in the following.

The referred to "occupant protection system" may refer to "front seat occupant protection system" and/or "lower body parts protection system", whereas occupant protection system "of" a vehicle may refer to occupant protection system "comprises in" a vehicle. "For" supporting protection may in this context refer to "adapted for" supporting protection.

Since the occupant protection system comprises a distance determining unit for determining a distance in a predeterminable direction between the airbag panel arrangement or the dashboard, and the vehicle seat or an occupant seated in the vehicle seat, it may be established where—and/or at what inclination—the vehicle seat, a backrest thereof and/or the vehicle occupant is positioned as compared to the airbag panel arrangement or dashboard. The predeterminable direction may be arbitrarily selected as deemed suitable, and accordingly, said distance may be determined from/to any arbitrary predetermineable e.g. point on said airbag panel arrangement or dashboard, to/from any arbitrary predeterminable e.g. point on said vehicle seat or an occupant seated therein. Said distance may hence be determined for instance between a point/portion of the airbag panel arrangement or dashboard and a point/portion of the vehicle seat closest to said airbag panel arrangement or dashboard. Similarly, said distance may for instance be determined between a point/portion of the airbag panel arrangement or dashboard and a point/portion on the backrest of the seat. Correspondingly, said distance may additionally or alternatively be determined for instance between a point/portion of the airbag panel arrangement or dashboard and a point/portion of said vehicle occupant, e.g. situated on a lower body portion of the vehicle occupant, such as e.g. his/her knee or shin, or an upper body portion of said vehicle occupant, such as e.g. his/her head, shoulder, torso etc. Determining the distance may be accomplished in any arbitrary manner, e.g. as commonly known in the art, for instance based on sensor input from commonly known distance detection sensors and/or sensors such as seat position sensors, cameras etc. A distance may further be determined in more than one direction, i.e. distance determinations may be carried out in several directions. The results from such plural distance determinations may be jointly analysed and/or treated separately. "Distance determining unit" may refer to "seating position determining unit" and/or "gap determining unit", whereas the expression distance determining unit "for" determining may refer to distance determining unit "adapted for" determining. "Determining" on the other hand may in this context refer to "deriving" and/or "measuring". "A distance" may refer to "a minimum distance", "a relevant distance", "a first distance", "at least a first distance" and/or "a gap", whereas "predeterminable" direction may refer to "predetermined" and/or "selected" direction. The expression "between said airbag panel arrangement or said dashboard", on the other hand, may refer to "between a position on—or a portion of—said airbag panel arrangement or a position on—or a portion of—said dashboard". Similarly, the expression "and said vehicle seat or an occupant" may in this context refer to "and a position on—or a portion of—said vehicle seat or a position on—or a portion of—an occupant". Moreover "an occupant" seated in the vehicle seat may in this context refer to "lower body parts of an occupant" seated in the vehicle seat.

Since the occupant protection system further comprises an exceedance determining unit for determining that the distance exceeds a predeterminable maximum threshold value, it may be established that the determined distance is greater than a distance considered to indicate that the vehicle seat is positioned in a moved back and/or greatly reclined position, or that the occupant seated therein is positioned moved back and/or in a relaxed posture. This in turn indicates that the airbag upon potential deployment may risk providing less sufficient protection for lower body parts of the vehicle occupant as compared to should the distance fall below the maximum threshold value. Subsequently, the vehicle occupant is accordingly considered to—when said distance exceeds the maximum threshold value—risk submarining in the event of an ongoing or imminent collision. The maximum threshold value may be set to any arbitrary value considered appropriate, and may for instance range from a hundred millimetres up to a couple thousand millimetres. More than one maximum threshold value may further be provided, for comparison with determined distances in different directions. Determining whether the determined distance exceeds the maximum threshold value may be accomplished in any arbitrary manner, e.g. by comparison as commonly known in the art. "Exceedance determining unit" may refer to "relaxed posture determining unit", whereas the expression exceedance determining unit "for" determining may refer to "exceedance determining unit "adapted for" determining. "Determining" on the other hand may in this context refer to "calculating" and/or "determining based on comparison". "Exceeds" a predeterminable maximum threshold value may refer to "is equal to or greater than" a predeterminable maximum threshold value, whereas "predeterminable" maximum threshold value may refer to "predetermined" and/or "selected" maximum threshold value. "Maximum threshold value" on the other hand may refer to "relaxed posture threshold value".

Since the occupant protection system further comprises a deployment determining unit for determining that one or more conditions for deployment of the airbag is fulfilled, it may be established that a situation with an ongoing or imminent collision has occurred and that a need has arisen for deployment of said airbag. Determining that at least one condition for deployment is fulfilled may be accomplished in any arbitrary manner, e.g. as commonly known in the art, for instance based on input from one or more commonly known collision detection sensors. "Deployment determining unit" may refer to "ongoing or imminent collision determining unit", whereas the expression deployment determining unit "for" determining may refer to deployment determining unit "adapted for" determining. "Determining" on the other hand may in this context refer to "deriving", "measuring" and/or "calculating", whereas "conditions" for deployment may refer to "requirements" for deployment.

Since the occupant protection system further comprises a panel displacing unit for displacing the airbag panel arrangement outwardly from the dashboard by means of the panel displacing system, the airbag panel arrangement may be ejected outward in an essentially longitudinal plane of the vehicle, i.e. essentially towards the vehicle seat and/or vehicle occupant. Thereby, the airbag panel arrangement may with support from the panel displacing system discussed above, optionally comprising e.g. one or more pyro actuators, be placed nearer—and/or at an improved inclination toward—the vehicle seat and subsequently also nearer—and/or at an improved inclination toward—the vehicle occupant seated therein. Accordingly, the gap between the airbag panel arrangement—and/or the airbag comprised therein—and the vehicle occupant may thus be reduced, whereby the airbag upon deployment may protect lower body parts of the occupant seated in the vehicle seat in an improved manner. "Panel displacing unit" may refer to "airbag displacing unit" and/or "panel ejecting unit", whereas the expression panel displacing unit "for" displacing may refer to panel displacing unit "adapted for" displacing. "By means of" the panel displacing system may refer to "with support from" the panel displacing system.

Optionally, the occupant protection system may comprise an airbag deployment unit for deploying the airbag. Thereby, the airbag may be deployed for protection of lower body parts of the occupant seated in the vehicle seat. Deployment of the airbag may be accomplished in any arbitrary manner, e.g. as commonly known in the art. "Airbag deployment unit" may refer to "airbag deploying unit", whereas the expression airbag deployment unit "for" deploying may refer to airbag deployment unit "adapted for" deploying. "Deploying" on the other hand may refer to "inflating". According to an example, the expression "an airbag deployment unit for deploying said airbag" may refer to "an airbag deployment unit for deploying said airbag, whereby said airbag is deployed a reduced distance from said vehicle seat and/or lower body parts of the vehicle occupant."

Optionally, the airbag panel arrangement may be displaceable between a default position and an ejected position, and the panel displacing unit is then adapted for displacing the airbag panel arrangement from the default position to the ejected position. Thereby, the airbag panel arrangement may be arranged at two different locations, namely the default position, which e.g. may be essentially flush with the dashboard, and the ejected position, which may be nearer—and/or at an improved inclination toward—the vehicle seat, and subsequently nearer—and/or at an improved inclination toward—the vehicle occupant seated therein. The ejected position in relation to the default position may be arbitrarily selected as deemed relevant for the situation at hand. "Displaceable" may refer to "movable" and or "ejectable", whereas displaceable "between a default position and an ejected position" may refer to displaceable "from a default position to an ejected position". "Default position", on the other hand, may refer to "default location" and/or "dashboard position", whereas the expression "ejected position" may refer to "displaced position", "ejected location" and/or "ejected position located closer to the vehicle seat and/or lower body parts of a vehicle occupant seated in said vehicle seat". "Displacing" the airbag panel arrangement may refer to "ejecting" the airbag panel arrangement.

Optionally, the panel displacing unit may be adapted for displacing the airbag panel arrangement a predeterminable distance in a longitudinal direction of the vehicle, and/or displacing the airbag panel arrangement a predeterminable distance in a downward or upward direction of the vehicle perpendicular to the longitudinal direction. Thereby, the airbag panel arrangement may be ejected toward the vehicle seat and subsequently toward the vehicle occupant seated therein in a relevant manner, thus enabling for the airbag to be deployed to protect lower body parts of the moved back and/or relaxed-sitting vehicle occupant in a relevant manner. The airbag panel arrangement may be displaced any arbitrary predeterminable distance in the longitudinal direction deemed appropriate; similarly, the airbag panel arrangement may be displaced any arbitrary predeterminable distance in the downward or upward direction deemed appropriate. The expression "the airbag" is displaced may refer to "an airbag module of the airbag" and/or "the airbag and/or airbag panel arrangement" is displaced, whereas "displacing said airbag panel arrangement" may refer to "displacing said airbag panel arrangement a predetermined distance". "Predeterminable distance" on the other hand may refer to "predetermined distance" and/or merely "distance". "In a longitudinal" direction" may refer to "in an essentially longitudinal" direction, whereas in a similar manner "in a downward or upward" direction may refer to "in an essentially downward or in an essentially upward" direction. "Perpendicular" to the longitudinal direction may on the other hand refer to "essentially perpendicular" to the longitudinal direction.

Optionally, the panel displacing unit may be adapted for displacing said airbag panel arrangement a distance being in the range of 100-200 millimetres in said longitudinal direction, and/or displacing said airbag panel arrangement a distance being in the range of 30-70 millimetres in said downward or upward direction. Thereby, the airbag panel arrangement may be ejected a relevant distance in a longitudinal direction and/or a relevant distance in a downward or upward direction toward the vehicle seat and subsequently toward the vehicle occupant seated therein, thus enabling for the airbag to be deployed from a relevant distance in a longitudinal direction and/or from a relevant distance in a downward or upward direction—and/or from a relevant inclination—to protect lower body parts of the moved back and/or relaxed-sitting vehicle occupant.

According to a third aspect of embodiments herein, the object is achieved by a vehicle comprising an occupant protection system as discussed above, a dashboard and a vehicle seat. Similar advantages as those mentioned in the foregoing in relation to the first and second aspects correspondingly apply to the third aspect, which is why these advantages are not further discussed.

According to a fourth aspect of embodiments herein, the object is achieved by a method performed by an occupant protection system of a vehicle for supporting protection of a vehicle occupant in the event of an ongoing or imminent collision. The occupant protection system comprises an airbag panel arrangement arranged in connection with a dashboard of the vehicle, which airbag panel arrangement comprises an inflatable airbag adapted to upon deployment protect lower body parts of a vehicle occupant seated in a vehicle seat facing the dashboard. The occupant protection system determines a distance in a predeterminable direction between the airbag panel arrangement or the dashboard and the vehicle seat or an occupant seated in the vehicle seat. The occupant protection system further determines that the distance exceeds a predeterminable maximum threshold value. Moreover, the occupant protection system determines that one or more conditions for deployment of the airbag is fulfilled. Furthermore, the occupant protection system displaces the airbag panel arrangement outwardly from the dashboard by means of a panel displacing system.

Optionally, the occupant protection system may deploy the airbag.

Optionally, displacing the airbag panel arrangement may comprise displacing the airbag panel arrangement by means of the panel displacing system, which panel displacing system comprises one or more pyro, mechanical and/or electrical actuators.

Optionally, the airbag panel arrangement may be displaceable between a default position and an ejected position. Displacing the airbag panel arrangement then comprises displacing the airbag panel arrangement from the default position to the ejected position.

Optionally, displacing the airbag panel arrangement may comprise displacing the airbag panel arrangement a predeterminable distance in a longitudinal direction of the vehicle, and/or displacing the airbag panel arrangement a predeterminable distance in a downward or upward direction of the vehicle perpendicular to the longitudinal direction.

Optionally, displacing the airbag panel arrangement may comprise displacing the airbag panel arrangement 100-200 millimetres in the longitudinal direction, and/or displacing the airbag panel arrangement 30-70 millimetres in the downward or upward direction.

Similar advantages as those mentioned in the foregoing in relation to the first and second aspects correspondingly apply to the fourth aspect, which is why these advantages are not further discussed.

According to a fifth aspect of embodiments herein, the object is achieved by a computer program product comprising a computer program containing computer program code means arranged to cause a computer or a processor to execute the steps of the occupant protection system discussed in the foregoing, stored on a computer-readable medium or a carrier wave. Yet again, similar advantages as those mentioned in the foregoing in relation to the first and second aspects correspondingly apply to the fifth aspect, which is why these advantages are not further discussed.

BRIEF DESCRIPTION OF THE DRAWINGS

The various aspects of the non-limiting embodiments, including particular features and advantages, will be readily understood from the following detailed description and the accompanying drawings, in which.

DETAILED DESCRIPTION

Figure 1:
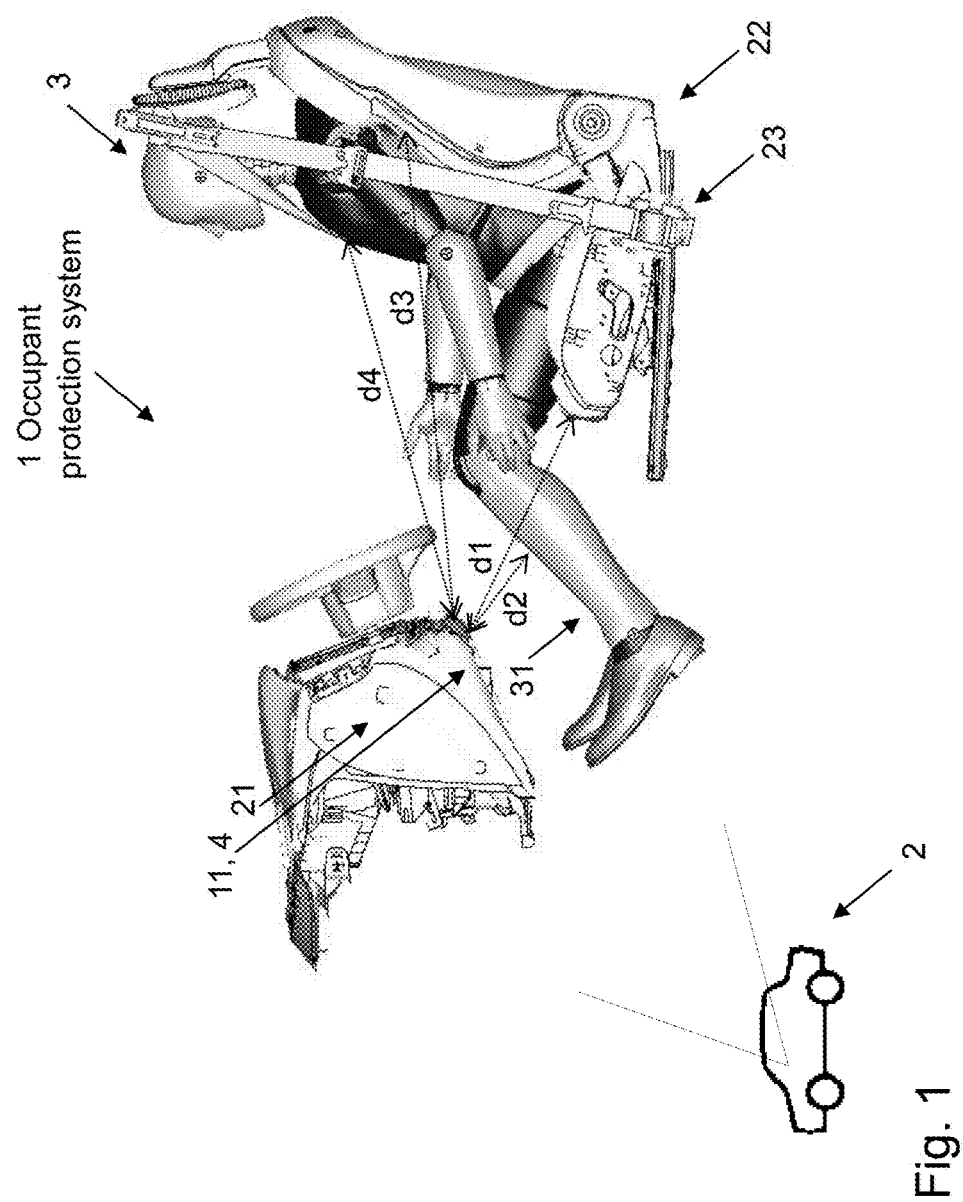
FIG. 1 illustrates a schematic view of an exemplifying occupant protection system comprising an exemplifying airbag panel arrangement according to embodiments of the disclosure.

Non-limiting embodiments of the present disclosure will now be described more fully hereinafter with reference to the accompanying drawings, in which currently preferred embodiments of the disclosure are shown. This disclosure may, however, be embodied in many different forms and should not be construed as limited to the embodiments set forth herein. Like reference characters refer to like elements throughout. Dashed lines of some boxes in the figures indicate that these units or actions are optional and not mandatory.

In the following, according to embodiments herein which relate to supporting protection of a vehicle occupant in the event of an ongoing or imminent collision, there will be disclosed an approach which, should a situation with an ongoing or imminent collision occur, enables protection of lower legs and/or knees of a vehicle driver or passenger seated in a dashboard-facing vehicle seat.

Referring now to the figures and FIG. 1 in particular, there is depicted a schematic view of an exemplifying occupant protection system 1 comprising an exemplifying airbag panel arrangement 11 according to embodiments of the disclosure. The occupant protection system 1—and subsequently the airbag panel arrangement 11—are here comprised in a vehicle 2 represented by an exemplifying semi-autonomous passenger car. The vehicle 2 further comprises an exemplifying dashboard 21, an exemplifying vehicle seat 22—here a driver's seat—facing the dashboard 21, and an exemplifying seat belt 23, the latter restraining an exemplifying vehicle passenger 3 seated in said vehicle seat 22. The airbag panel arrangement 11—which is adapted to be arranged in connection with the dashboard 21—comprises an inflatable airbag 111 (shown in FIG. 2) adapted to upon deployment protect lower body parts 31 of the vehicle occupant 3. The airbag panel arrangement 11 further comprises a panel displacing system 112 (shown in FIG. 5)—comprising exemplifying optional one or more pyro, mechanical and/or electrical actuators—adapted for supporting displacement of the airbag panel arrangement 11 outwardly from the dashboard 21. In FIG. 1, the airbag panel arrangement 11 is arranged at a default position 4, here essentially flush with the dashboard 21. Further shown in FIG. 1 is an exemplifying distance d1 in an exemplifying predeterminable direction between the airbag panel arrangement 11 or the dashboard 21 and the vehicle seat 22. In addition to distance d1, alternative exemplifying distances d2, d3, d4 in alternative exemplifying directions between the airbag panel arrangement 11 or the dashboard 21 and the vehicle seat 22 or the occupant 3 seated in the vehicle seat 22, are depicted.

Figure 2:
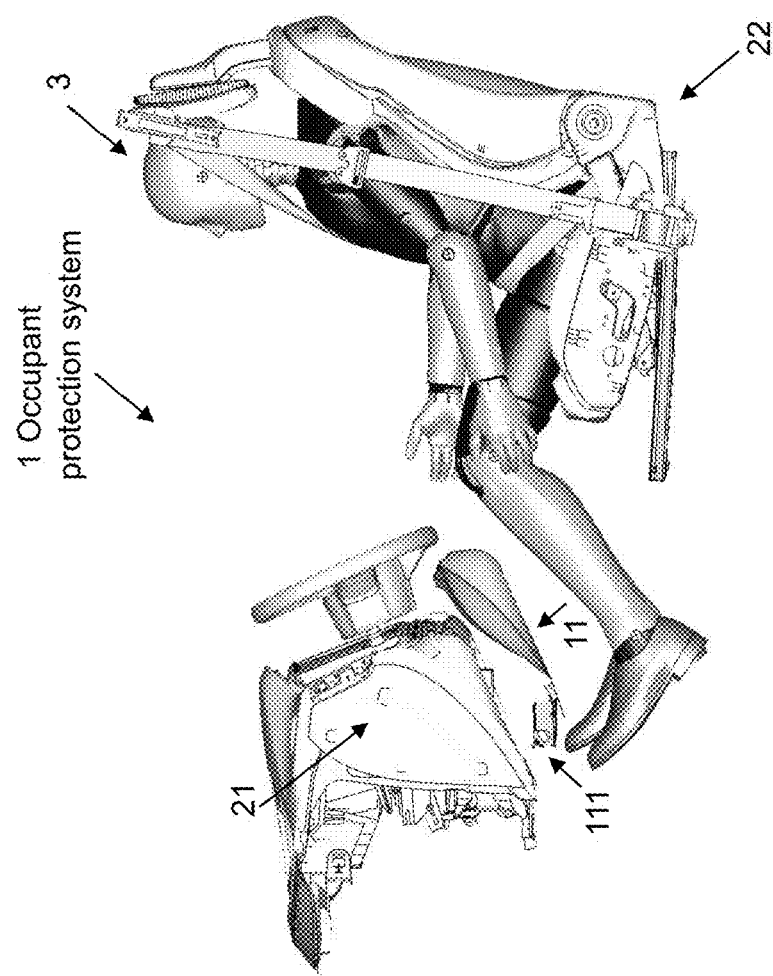
FIG. 2 illustrates a schematic view of the airbag panel arrangement shown in FIG. 1 during displacement according to embodiments of the disclosure.
Figure 3:
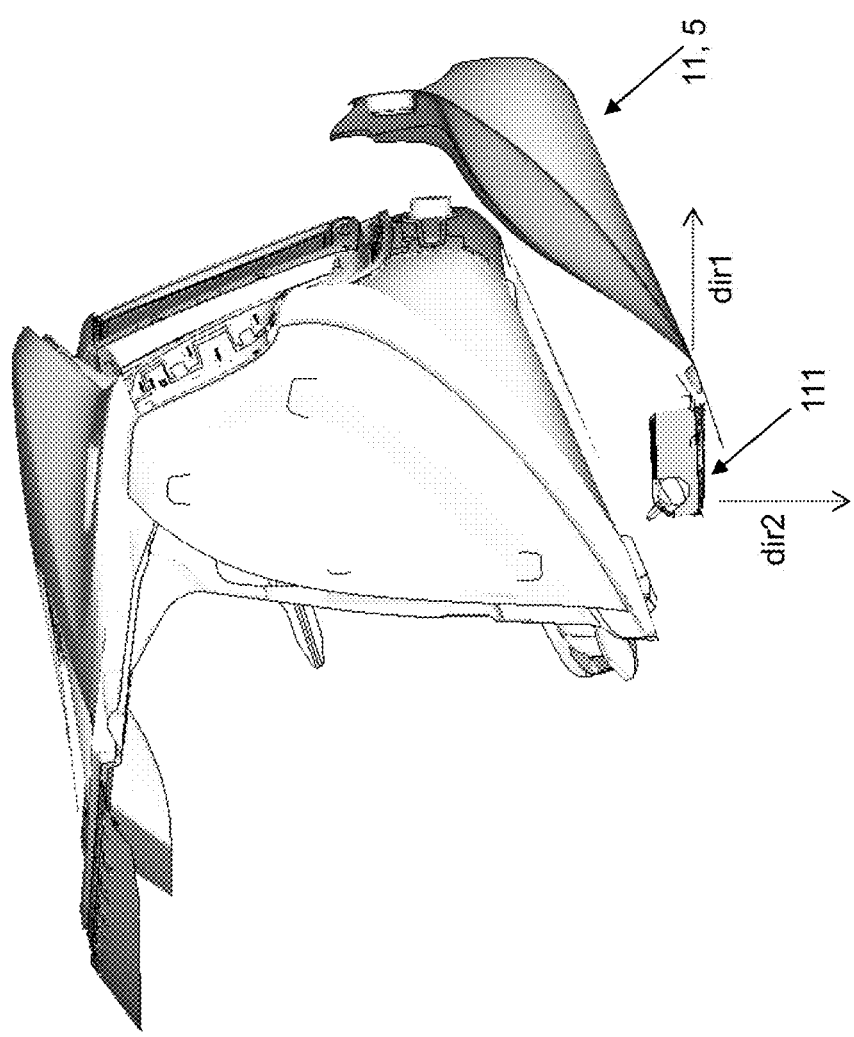
FIG. 3 illustrates a schematic view of an exemplifying displaced airbag panel arrangement according to embodiments of the disclosure.

FIG. 2 illustrates a schematic view of the airbag panel arrangement 11 shown in FIG. 1 during displacement according to embodiments of the disclosure, whereas FIG. 3 illustrates a schematic view of an exemplifying displaced airbag panel arrangement 11 according to embodiments of the disclosure. The airbag panel arrangement 11 is in FIG. 3 located at an exemplifying ejected position 5. The airbag panel arrangement 11 has here by means of the panel displacing system 112 e.g. pyro actuators (shown in FIG. 5) been displaced a predeterminable distance, e.g. 150 millimeters, in a longitudinal direction dir1 of the vehicle 2, and in addition thereto, displaced a predeterminable distance, e.g. 50 millimeters, in a downward direction dir2 of the vehicle 2 perpendicular to the longitudinal direction dir1.

Figure 4:
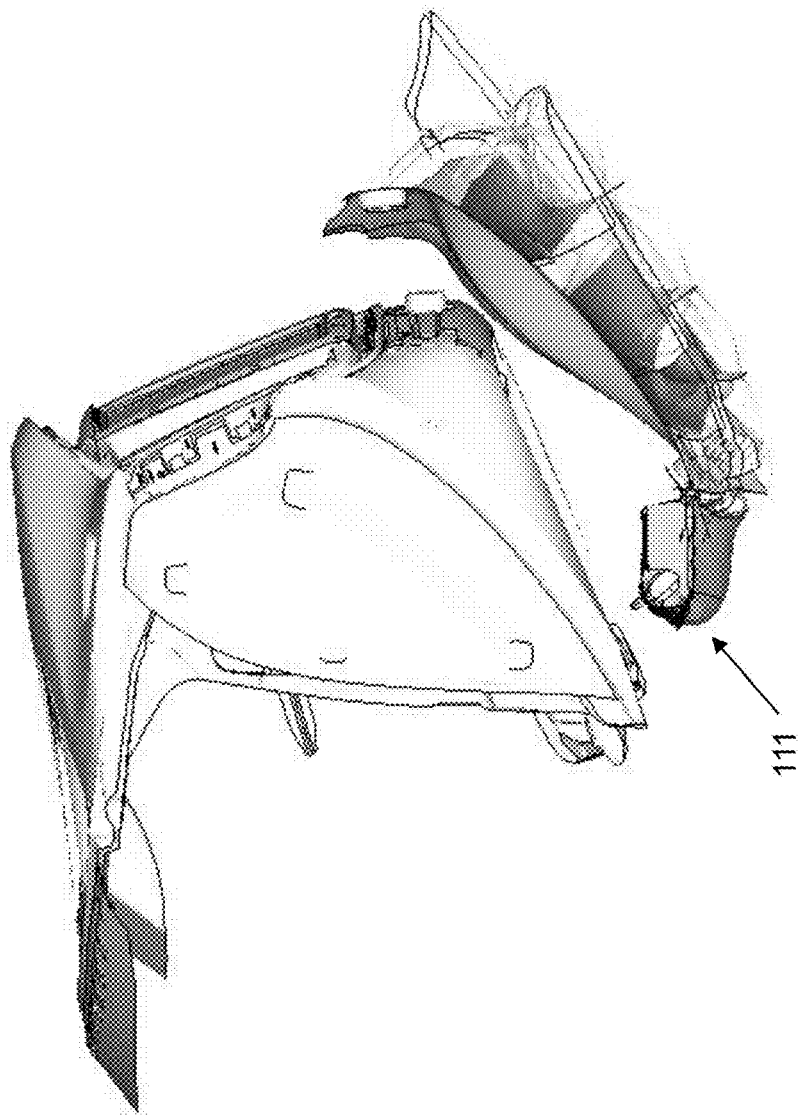
FIG. 4 illustrates the displaced airbag panel arrangement shown in FIG. 3 with an airbag comprised therein being deployed according to embodiments of the disclosure.

FIG. 4 illustrates the displaced airbag panel arrangement 11 shown in FIG. 3 with the airbag 111 comprised therein 11 being deployed according to embodiments of the disclosure.

Figure 5:
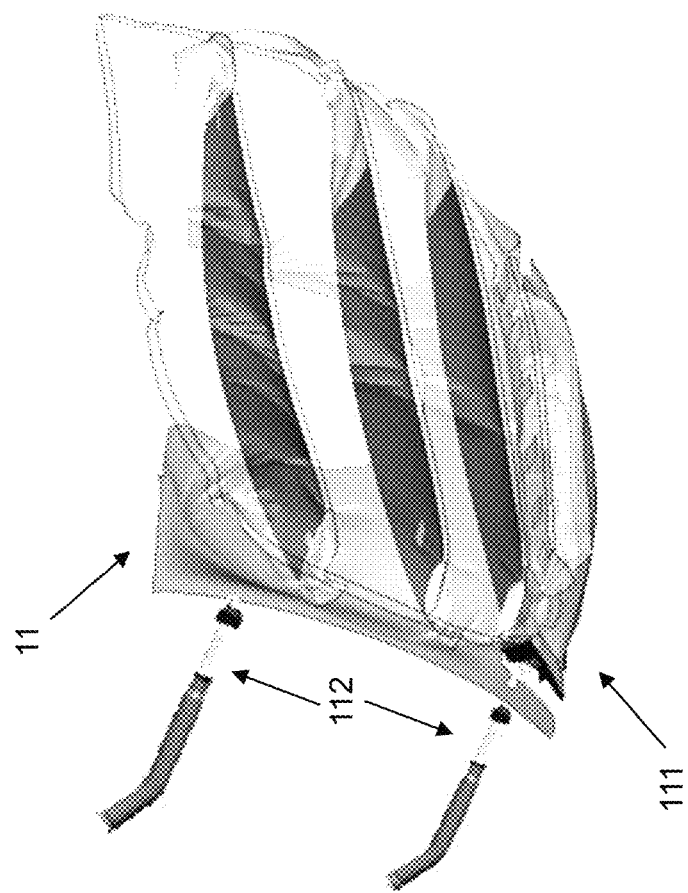
FIG. 5 illustrates a schematic view of exemplifying pyro, mechanical and/or electrical actuators of an exemplifying airbag panel arrangement with a deployed airbag according to embodiments of the disclosure.

FIG. 5, on the other hand, illustrates a schematic view of exemplifying pyro, mechanical and/or electrical actuators 112 of an exemplifying airbag panel arrangement 11 with a deployed airbag 111 according to embodiments of the disclosure.

As further shown in FIG. 6, which is a schematic block diagram illustrating an exemplifying occupant protection system 1 according to embodiments of the disclosure, the occupant protection system 1 comprises a distance determining unit 101, an exceedance determining unit 102, a deployment determining unit 103, a panel displacing unit 104 and an optional airbag deployment unit 105, all of which will be described in greater detail in conjunction with FIG. 7. Furthermore, the embodiments herein for supporting protection of a vehicle occupant 3 in the event of an ongoing or imminent collision, may be implemented through one or more processors, such as a processor 106, here denoted CPU, together with computer program code for performing the functions and actions of the embodiments herein. Said program code may also be provided as a computer program product, for instance in the form of a data carrier carrying computer program code for performing the embodiments herein when being loaded into the occupant protection system 1. One such carrier may be in the form of a CD ROM disc. It is however feasible with other data carriers such as a memory stick. The computer program code may furthermore be provided as pure program code on a server and downloaded to the occupant protection system 1. The occupant protection system 1 may further comprise a memory 107 comprising one or more memory units. The memory 107 may be arranged to be used to store e.g. information, and further to store data, configurations, schedulings, and applications, to perform the methods herein when being executed in the occupant protection system 1. For instance, the computer program code may be implemented in the firmware, stored in FLASH memory 107, of an embedded processor 106. Furthermore, the distance determining unit 101, the exceedance determining unit 102, the deployment determining unit 103, the panel displacing unit 104, the optional airbag deployment unit 105, the optional processor 106 and/or the optional memory 107 may at least partly be comprised in the vehicle 2—for instance in one or more nodes 108 thereof such as electronic control units (ECUs). Those skilled in the art will also appreciate that said units 100, 101, 102, 103, 104, 105 described above, and which will be described in more detail later on in this description, may refer to a combination of analog and digital circuits, and/or one or more processors configured with software and/or firmware, e.g. stored in a memory such as the memory 107, that when executed by the one or more processors such as the processor 106 perform as will be described in more detail in conjunction with FIG. 7. One or more of these processors, as well as the other digital hardware, may be included in a single ASIC (Application-Specific Integrated Circuitry), or several processors and various digital hardware may be distributed among several separate components, whether individually packaged or assembled into a SoC (System-on-a-Chip).

Figure 6:
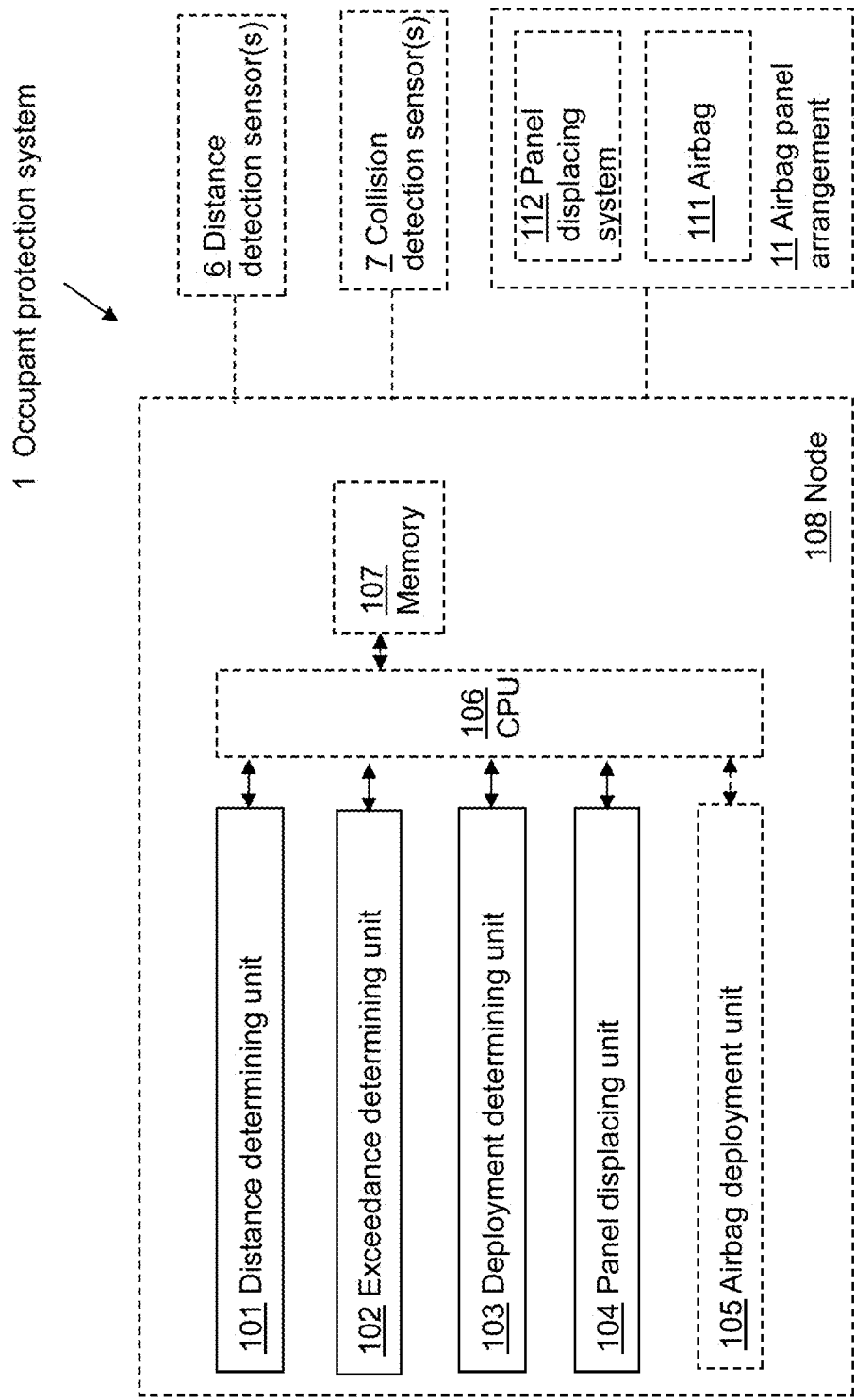
FIG. 6 is a schematic block diagram illustrating an exemplifying occupant protection system according to embodiments of the disclosure.

Further shown in FIG. 6 are exemplifying one or more optional distance detection sensors 6, e.g. represented by seat position sensors, cameras etc., and optional one or more collision detection sensors 7.

Figure 7:
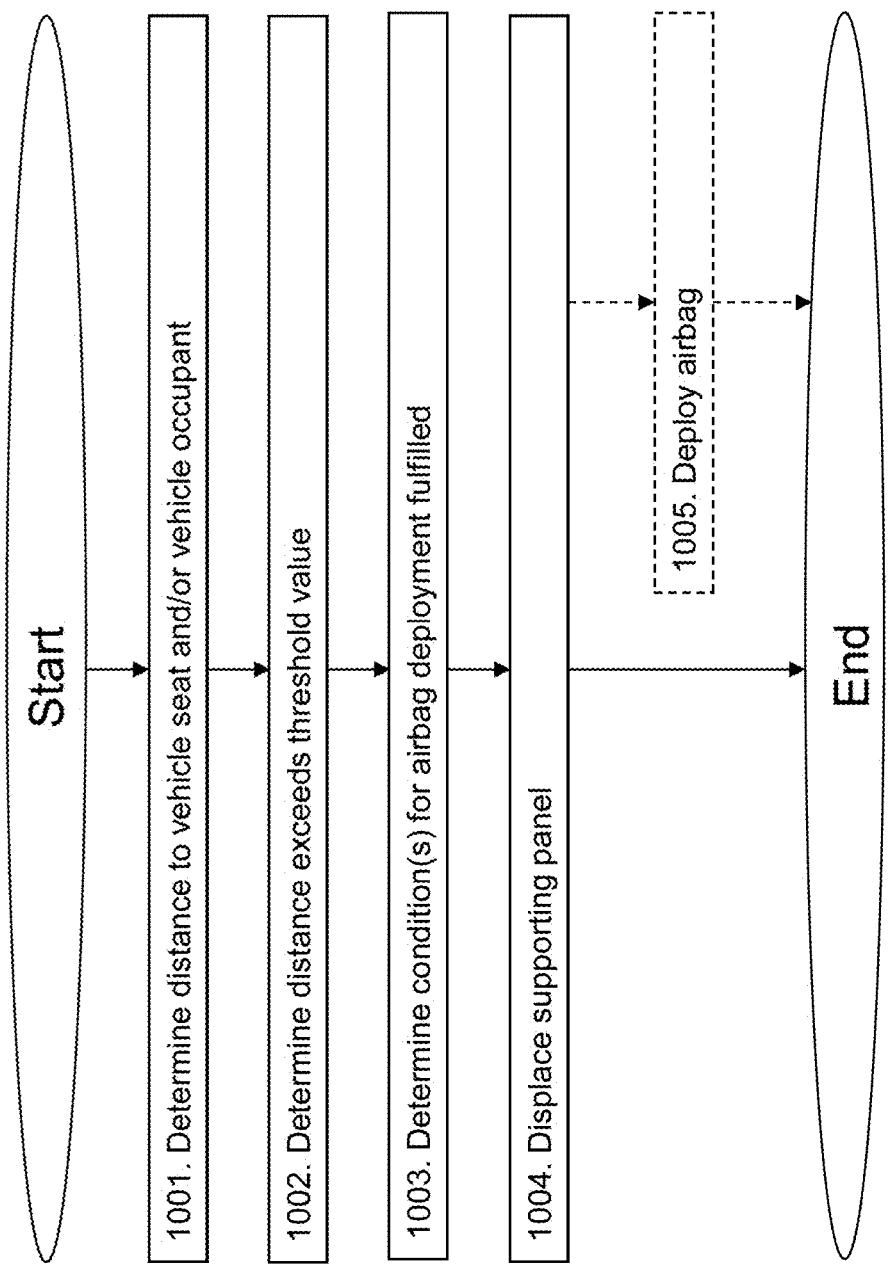
FIG. 7 is a flowchart depicting an exemplifying method performed by an occupant protection system according to embodiments of the disclosure.

FIG. 7 is a flowchart depicting an exemplifying method performed by an occupant protection system 1 according to embodiments of the disclosure. Said method is for supporting protection of a vehicle occupant 3 in the event of an ongoing or imminent collision. The occupant protection system 1 comprises an airbag panel arrangement 11 arranged in connection with a dashboard 21 of the vehicle 2, which airbag panel arrangement 11 comprises an inflatable airbag 111 adapted to upon deployment protect lower body parts 31 of a vehicle occupant 3 seated in a vehicle seat 22 facing the dashboard 21. The exemplifying method, in which e.g. Action 1001 and Action 1002 may be continuously repeated, comprises the following actions discussed with support from FIGS. 1-6. Said actions may be performed in any suitable and/or alternative order, for instance may Action 1001 be performed simultaneously with—and/or following upon— Action 1003.

Action 1001

In Action 1001, the occupant protection system 1 determines—e.g. by means of the distance determining unit 101—a distance d1 in a predeterminable direction between the airbag panel arrangement 11 or the dashboard 21 and the vehicle seat 22 or an occupant 3 seated in the vehicle seat 22. Thus, as shown with support from at least FIGS. 1 and 6, it may be established, e.g. based on input from the one or more distance detection sensors 6, where—and/or at what inclination—the vehicle seat 22, a backrest thereof and/or the vehicle occupant 3 is positioned as compared to the airbag panel arrangement 11 or dashboard 21.

Action 1002

In Action 1002, the occupant protection system 1 determines—e.g. by means of the exceedance determining unit 102—that the distance d1 exceeds a predeterminable maximum threshold value. Thus, as shown with support from at least FIGS. 1 and 6, it may be established that the determined distance d1 is greater than a distance considered to indicate that the vehicle seat 22 is positioned in a moved back and/or greatly reclined position, or that the occupant 3 seated therein 22 is positioned moved back and/or in a relaxed posture. This in turn indicates that the airbag 111 upon potential deployment may risk providing less sufficient protection for lower body parts 31 of the vehicle occupant 3 as compared to should the distance d1 fall below the maximum threshold value. Subsequently, the vehicle occupant 3 is accordingly considered to—when said distance d1 exceeds the maximum threshold value—risk submarining in the event of an ongoing or imminent collision.

Action 1003

In Action 1003, the occupant protection system 1 determines—e.g. by means of the deployment determining unit 103—that one or more conditions for deployment of the airbag 111 is fulfilled. Thus, as shown with support from at least FIGS. 1 and 6, it may be established, e.g. based on input from the one or more collision detection sensors 7, that a situation with an ongoing or imminent collision has occurred and that a need has arisen for deployment of said airbag 111.

Action 1004

In Action 1004, the occupant protection system 1 displaces—e.g. by means of the panel displacing unit 104—the airbag panel arrangement 11 outwardly from the dashboard 21 by means of a panel displacing system 112. Thus, as shown with support from at least FIGS. 1-3 and 5-6, the airbag panel arrangement 11 may be ejected outward in an essentially longitudinal plane of the vehicle 2, i.e. essentially towards the vehicle seat 22 and/or vehicle occupant 3. Thereby, the airbag panel arrangement 11 may with support from the panel displacing system 112, be placed nearer— and/or at an improved inclination toward—the vehicle seat 22 and subsequently also nearer—and/or at an improved inclination toward—the vehicle occupant 3 seated therein 22. Accordingly, the gap between the airbag panel arrangement 11—and/or the airbag 111 comprised therein—and the vehicle occupant 3, may thus be reduced, whereby the airbag 111 upon deployment may protect lower body parts 31 of the occupant 3 seated in the vehicle seat 22 in an improved manner.

That is, in addition to being adapted to be arranged in a default and/or original location 4 in connection with a vehicle dashboard 21, the airbag panel arrangement 11 is adapted to additionally—by means of the panel displacing system 112—be able to be arranged at a position oriented and/or located outwardly from the dashboard 21, such as essentially towards a vehicle seat 22 facing said dashboard 21. Thereby, the airbag panel arrangement 11 supports being arranged at a default position 4 in relation to the dashboard 21, and in addition thereto, also at an at least first ejected position 5 further out and/or away from the dashboard 21. The airbag panel arrangement 11 may accordingly support that a gap and/or distance between the vehicle seat 22 or lower body parts 31 of a potential vehicle occupant 3 seated therein 22 and the airbag panel arrangement 11 may be decreased should the airbag panel arrangement 11 be displaced to the at least first ejected position 5. Consequently, the airbag panel arrangement 11 may support that in the event of an ongoing or impending collision, said airbag panel arrangement 11 may be displaced outwardly from the dashboard 21, subsequently closer to—and/or at a modified inclination toward—the vehicle seat 22 and/or a potential vehicle occupant 3 seated therein, a scenario which may be desirable should the vehicle occupant 3 sit in a relaxed posture/position, i.e. should the vehicle seat 22 be situated at a moved back position and/or should said seat 22 and/or a backrest thereof be greatly reclined. In such a scenario, with the airbag panel arrangement 11 supporting that the airbag 111 in the at least first ejected position 5 may be deployed closer to—and/or from an improved angle—in view of the vehicle seat 22 and/or potential vehicle occupant 3 seated in said vehicle seat 22, the protection provided by the deployed airbag 111 to the potential vehicle occupant 3 in his/her moved back and/or greatly reclined position, may be more sufficient than should the airbag 111 be deployed with the airbag panel arrangement 11 located in its default position 4. Accordingly, submarining—i.e. the tendency of the vehicle occupant 3 in a collision situation sliding forward under his/her seat belt 23—may be avoided in situations where the vehicle occupant 3 may be seated in a moved back and/or greatly reclined position. Thus, with the introduced airbag panel arrangement 11 supporting airbag deployment both when the airbag panel arrangement 11 is in the default position 4—which may be suitable when the vehicle seat 22 is in a normal position for driving—and when the airbag panel arrangement 11 is in the at least first ejected position 5—which may be suitable when the vehicle seat 22 is moved back and/or when the seat 22 and/or a backrest thereof is greatly reclined—different protection may be supported for different vehicle occupant seating scenarios.

Optionally, the Action 1004 of displacing the airbag panel arrangement 11 may comprise—and/or the panel displacing unit 104 may be adapted for—displacing the airbag panel arrangement 11 by means of the panel displacing system 112, which panel displacing system 112 comprises one or more pyro, mechanical and/or electrical actuators. Thus, as shown with support from at least FIGS. 5-6, with the panel displacing system comprising one or more pyro, mechanical and/or electrical actuators, displacement of the airbag panel arrangement 11 outwardly from the vehicle dashboard 21 may be accomplished rapidly enough for the airbag panel arrangement 11 to—following upon detection of an ongoing or imminent collision—potentially be ejected prior to and/or simultaneously with the airbag 111 comprised therein being deployed.

Optionally, the airbag panel arrangement 11 may be displaceable between a default position 4 and an ejected position 5. Action 1004 of displacing the airbag panel arrangement 11 then comprises—and/or the panel displacing unit 104 may be adapted for—displacing the airbag panel arrangement 11 from the default position 4 to the ejected position 5. Thus, as shown with support from at least FIGS. 1-3 and 5-6, the airbag panel arrangement 11 may be arranged at two different locations, namely the default position 4, which e.g. may be essentially flush with the dashboard 21, and the ejected position 5, which may be nearer—and/or at an improved inclination toward—the vehicle seat 22, and subsequently nearer—and/or at an improved inclination toward—the vehicle occupant 3 seated therein 22.

Further optionally, Action 1004 of displacing the airbag panel arrangement 11 may comprise—and/or the panel displacing unit 104 may be adapted for—displacing the airbag panel arrangement 11 a predeterminable distance in a longitudinal direction dir1 of the vehicle 2, and/or displacing the airbag panel arrangement 11 a predeterminable distance in a downward dir2 or upward direction of the vehicle 2 perpendicular to the longitudinal direction dir1. Thus, as shown with support from at least FIGS. 3 and 6, the airbag panel arrangement 11 may be ejected toward the vehicle seat 22 and subsequently toward the vehicle occupant 3 seated therein 22 in a relevant manner, thus enabling for the airbag 111 to be deployed to protect lower body parts 31 of the moved back and/or relaxed-sitting vehicle occupant 3 in a relevant manner.

Further optionally, Action 1004 of displacing the airbag panel arrangement 11 may comprise—and/or the panel displacing unit 104 may be adapted for—displacing the airbag panel arrangement 11 100-200 millimetres in the longitudinal direction dir1, and/or displacing the airbag panel arrangement 11 30-70 millimetres in the downward dir2 or upward direction. Thus, as shown with support from at least FIGS. 3 and 6, the airbag panel arrangement 11 may be ejected a relevant distance in a longitudinal direction dir1 and/or a relevant distance in a downward dir2 or upward direction toward the vehicle seat 22 and subsequently toward the vehicle occupant 3 seated therein 22, thus enabling for the airbag 111 to be deployed from a relevant distance in a longitudinal direction dir1 and/or from a relevant distance in a downward dir2 or upward direction—and/or from a relevant inclination—to protect lower body parts 31 of the moved back and/or relaxed-sitting vehicle occupant 3.

Action 1005

In optional Action 1005, the occupant protection system 1 may—e.g. by means of the optional airbag deployment unit 105—deploy the airbag 111. Thus, as shown with support from at least FIGS. 4 and 6, the airbag 11 may be deployed for protection of lower body parts 31 of the occupant seated in the vehicle seat 22.

The person skilled in the art realizes that the present disclosure by no means is limited to the preferred embodiments described above. On the contrary, many modifications and variations are possible within the scope of the appended claims. It should furthermore be noted that the drawings not necessarily are to scale and the dimensions of certain features may have been exaggerated for the sake of clarity. Emphasis is instead placed upon illustrating the principle of the embodiments herein. Additionally, in the claims, the word "comprising" does not exclude other elements or steps, and the indefinite article "a" or "an" does not exclude a plurality.

The invention claimed is:

1. An occupant protection system for supporting protection of a vehicle occupant in the event of an ongoing or imminent collision, wherein the occupant protection system comprises:
   an airbag panel arrangement connected to a dashboard of a vehicle, the airbag panel arrangement comprising:
      an inflatable airbag adapted to upon deployment protect lower body parts of the vehicle occupant seated in a vehicle seat facing the dashboard; and
      a panel displacing system adapted for supporting displacement of the airbag panel arrangement outwardly from the dashboard from a default position to an at least first ejected position, wherein deployment of the inflatable airbag from the airbag panel arrangement is supported in both the default position of the panel displacing system and in the at least first ejected position of the panel displacing system.

2. The occupant protection system according to claim 1, wherein the panel displacing system comprises one or more pyro, mechanical and/or electrical actuators.

3. The occupant protection system according to claim 1, further comprising:
   a distance determining unit for determining a distance in a predeterminable direction between the airbag panel arrangement or the dashboard and the vehicle seat or an occupant seated in the vehicle seat;
   an exceedance determining unit for determining whether the distance exceeds a predeterminable maximum threshold value;

a deployment determining unit for determining that one or more conditions for deployment of the airbag is fulfilled; and a panel displacing unit for displacing the airbag panel arrangement outwardly from the dashboard by means of the panel displacing system when the distance exceeds the maximum threshold value.

4. The occupant protection system according to claim 3, further comprising:

an airbag deployment unit for deploying said airbag.

5. The occupant protection system according to claim 3, wherein the airbag panel arrangement is displaceable between the default position and the ejected position, the panel displacing unit then being adapted for displacing the airbag panel arrangement from the default position to the ejected position.

6. The occupant protection system according to claim 3, wherein the panel displacing unit is adapted for:

displacing the airbag panel arrangement a predeterminable distance in a longitudinal direction of said vehicle and;

displacing the airbag panel arrangement a predeterminable distance in a downward or upward direction of said vehicle perpendicular to said longitudinal direction.

7. The occupant protection system according to claim 6, wherein the panel displacing unit is adapted for:

displacing the airbag panel arrangement 100-200 millimetres in the longitudinal direction and;

displacing the airbag panel arrangement 30-70 millimetres in the downward or upward direction.

8. A method for supporting protection of a vehicle occupant in the event of an ongoing or imminent collision, comprising:

determining a distance between an airbag panel arrangement or a dashboard and a vehicle seat or an occupant seated in the vehicle seat;

determining whether the distance exceeds a threshold value;

determining whether one or more conditions for deployment of the airbag are fulfilled; and responsive to determining that the one or more conditions for deployment are fulfilled and that the distance exceeds the predeterminable maximum threshold value, displacing the airbag panel arrangement outwardly from the dashboard by means of a panel displacing system from a default position to an at least first ejected position wherein deployment of the inflatable airbag from the airbag panel arrangement is supported in both the default position of the panel displacing system and in the at least first ejected position of the panel displacing system.

9. The method according to claim 8, further comprising:

responsive to determining that one or more conditions for deployment of the airbag are fulfilled, deploying the airbag in either the default position or the at least first ejected position by means of an airbag deployment unit.

10. The method according to claim 8, wherein the airbag panel assembly is displaced by the panel displacing system by way of one or more pyro, mechanical and/or electrical actuators.

11. The method according to claim 8, wherein displacing the airbag panel arrangement comprises:

displacing the airbag panel arrangement a predeterminable distance in a longitudinal direction of the vehicle.

12. The method according to claim 11, wherein displacing the airbag panel arrangement further comprises:

displacing the airbag panel arrangement 100-200 millimetres in the longitudinal direction, and displacing the airbag panel arrangement 30-70 millimetres in the downward or upward direction.

13. A non-transitory computer-readable medium comprising instructions for causing processing circuitry of an occupant protection system to:

determine a distance between an airbag panel arrangement or a dashboard and a vehicle seat or an occupant seated in the vehicle seat;

determine whether the distance exceeds a threshold value;

determine whether one or more conditions for deployment of the airbag are fulfilled; and responsive to determining that the one or more conditions for deployment are fulfilled and that said distance exceeds the predeterminable maximum threshold value, displace the airbag panel arrangement outwardly from the dashboard by means of a panel displacing system from a default position to an at least first ejected position, wherein deployment of the inflatable airbag from the airbag panel arrangement is supported in both the default position of the panel displacing system and in the at least first ejected position of the panel displacing system.

14. The method according to claim 11, wherein displacing the airbag panel arrangement comprises:

displacing the airbag panel arrangement in a downward or upward direction of the vehicle perpendicular to the longitudinal direction.

15. The occupant protection system according to claim 1, further comprising an airbag deployment unit, and wherein the airbag deployment unit is adapted for deploying the airbag from the airbag panel arrangement both:

when the airbag panel arrangement is in the default position, wherein the panel displacing system has not displaced the airbag panel arrangement; and when the airbag panel arrangement is in the at least first ejected position, wherein the panel displacing system has displaced the airbag panel arrangement.

16. The occupant protection system according to claim 1, wherein the panel displacing system is adapted for supporting displacement of the airbag panel arrangement to the at least first ejected position at a modified inclination toward the vehicle seat.

17. The occupant protection system according to claim 1, wherein deployment of the inflatable airbag from the airbag panel arrangement comprises inflating the airbag.

* * * * *